United States Patent Office 3,451,833
Patented June 24, 1969

3,451,833
ORGANOSILICON BINDERS
Eckhard Bonitz, Frankenthal, Pfalz, and August Rettig, Ludwigshafen (Rhine), Germany, assignors to Badische Anilin- & Soda-Fabrik Aktiengesellschaft, Ludwigshafen am Rhine, Germany
No Drawing. Filed Sept. 30, 1965, Ser. No. 491,897
Claims priority, application Germany, Oct. 14, 1964, B 78,909
Int. Cl. C09j 3/16; C08h 15/00
U.S. Cl. 106—287        4 Claims

ABSTRACT OF THE DISCLOSURE

Organosilicon binders comprising (a) organosilanol, polycondensation product or reaction product thereof and (b) organometallic silanolate or organometallic siloxanate.

---

We have found that valuable organosilicon binders are obtained by mixing organosilanols or their polycondensation products or reaction products with organometal silanolates or organometall siloxanates.

Organosilanols include particularly monoorganosilanetriols, i.e. compounds containing three hydroxyl groups for each silicon atom. Polycondensation products and reaction products include for example monoorganosiloxanols or other products which contain Si—OH—, Si—H—, Si—NH—, Si—O—C— or Si—Si groups in an arrangement of the atoms in a chain, and not only on terminal members of the chain, but also at least on some, and in some cases on all, other members of the chain. These include dimers and trimers of diorganosilanediols containing Si—OH— or Si—OR— groups as terminal groups, R denoting an alkyl group. These compounds may be represented for example by the following formulae:

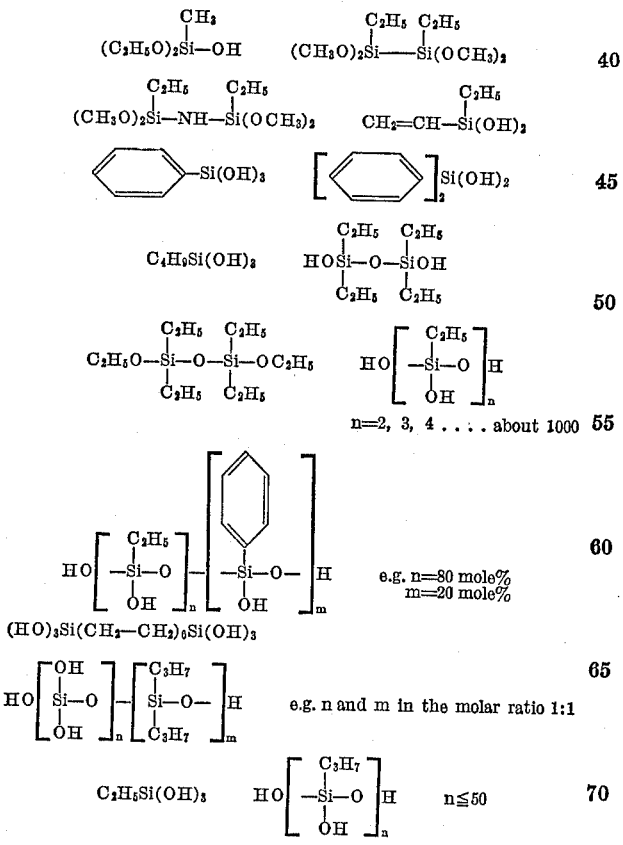

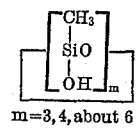

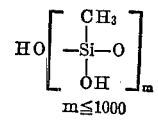

$CH_2=CH—Si(OH)_3$       $CH_2=CH—CH_2—Si(OH)_3$ $H_2N(CH_2)_4Si(OH)_3$       $(HO)_3Si(CH_2)_4Si(OH)_3$

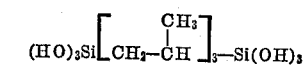

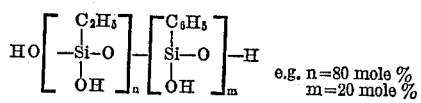

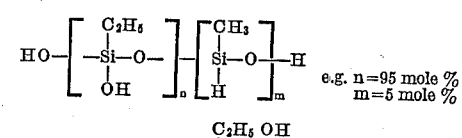

The compounds are in general liquid and may be used as such or in solution. It is obviously also possible to use the compounds in solid form by converting them into the solid form for example by adsorption on conventional adsorbents, for example silica gel, cork powder, polystyrene foam flakes, wood chips, pumice granulate, polyurethane foam, cellulose, paper or aluminum oxide.

Organometallic silanolates or organometallic siloxanates include in particular the appropriate calcium compounds. Instead of calcium, the compounds may exclusively or partly contain other metals, for example aluminum, magnesium, titanium, zirconium, iron, chromium, nickel, cobalt, tin and lead. Such compounds may be represented for example by the following formulae in which R denotes an alkyl, aryl or alkenyl radical:

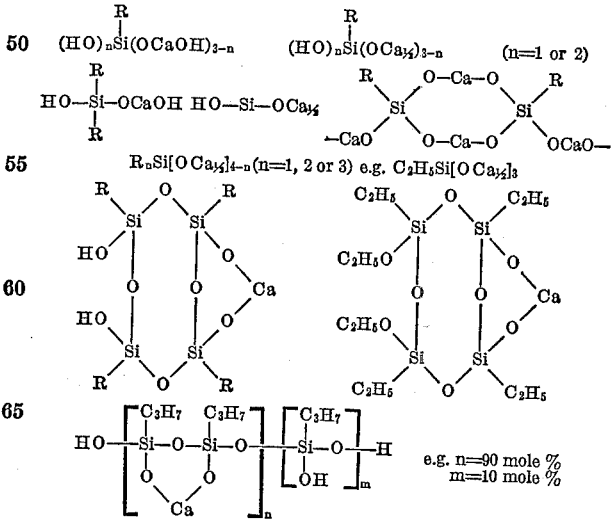

The compounds are in general solid to semisolid and are used in the form of powders, dispersions or pastes. Organosilanols and their polycondensation products and reaction products are known. They may be prepared from silanes by adding on olefins followed by treatment with water or from organosilicon chloride compounds with water.

Organocalcium silanolates and organocalcium siloxanates may be prepared from organochlorosilanes and calcium hydroxide or from organosilanols or organoalkoxysilanes and calcium oxide. Corresponding compounds of other metals are formed using other metal oxides or metal hydroxides.

The binders according to this invention can also contain fillers. These includes both active fillers, for example cement which actively reacts in the setting of the binder, and also passive fillers, for example finely divided polystyrene foam, which during setting are merely passively enclosed.

Examples of such fillers are: sand, slate powder, alumina, rock such as limestone, marble, granite, basalt, quartz, dolomite, silica, silicates, metal oxides, such as $Al_2O_3$, $MgO$, $Fe_2O_3$, $TiO_2$, $PbO_2$, $Cr_2O_3$, $ZnO$, $SiO_2$, metal hydroxides, such as $Al(OH)_3$, $Mg(OH)_2$, $Fe(OH)_3$, diatomite, vermiculite, mica, asbestos, inorganic glasses, particularly silicate glasses, glass wool, slag wool, ceramic materials, such as porcelain, stoneware, fireclay, brick, cement of all types, gypsum, phosphate, polyphosphoric acids, cellulose, cellulosic materials, such as wood, straw, paper, cork, peat, reeds, cellulose esters, cellulose ethers and also polycondensation products, such as polyesters, polyamides, and polycarbonates and phenoplast or aminoplast resins.

Plastics, particularly polymers of $\alpha,\beta$-unsaturated organic polymerisable compounds, for example of olefins, such as ethylene, propylene, isobutylene, styrene, $\alpha$-methylstyrene or vinyltoluenes, and of 1,3-dienes, such as butadiene or isoprene, are also suitable. Polymers of vinyl chloride or vinylidene chloride or of esters of acrylic or methacrylic acid with alcohols having one to eight carbon atoms may also be used. Styrene homopolymers and styrene copolymers have a particular importance among the said compounds.

The organic plastics may be in the form of powder, granulate in the form of beads, flakes, chips, small tubes, small rods, plates or fibres.

Finely divided expanded plastics, for example ethylene or styrene foam polymers, have special importance as fillers because the binders according to this invention are particularly suitable for bonding organic materials to inorganic materials.

The components of the binders are hereinafter included in groups. Group A are organosilanols and organosiloxanes, group B are the calcium siloxanates and group C are the fillers.

With regard to the setting and use of the binders in practice, the following may be said:

Setting occurs when at least one substance of group A is brought into contact with at least one substance from group B.

Organosiloxanates of divalent metals or of metals of higher valency give higher mechanical strengths after cure than the corresponding compounds of metals which merely form monovalent ions. If the acid components, particularly silicic acid components, of the organosilicon binders according to this invention are neutralized by metal oxides, the cured materials are distinguished by unusual resistance both to acids and bases or water. Whereas for example ethylpolysiloxane resin $(C_2H_5SiO_{3/2})$ is readily dissolved by solutions of caustic soda in methanol at room temperature, a cured ethylpolysiloxane resin having an appropriate content of ethylcalcium siloxanate is substantially resistant to alcoholic caustic alkali solutions.

The setting process is substantially a condensation in which the increase in the size of the molecule takes place, depending on the type of substances, by elimination of water, alcohols, hydrogen gas or even ammonia.

We have found that alcohols have a regulating effect on the setting process.

In Example 1 below, a binder mixture is described which contains the following components:

A.—Ethylsiloxane as a liquid component (50% by weight solution in propanol) having the approximate composition:

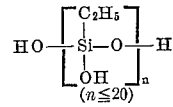

It may be obtained for example by hydrolysis of ethyltrichlorosilane.

B.—Ethylcalcium siloxanate, having the approximate composition: $C_2H_5Si(OCa_{1/2})_2$. It is a solid white powder (particle size not more than 0.1 mm.). It may be obtained for example by treating ethyltrichlorosilane with calcium hydroxide and separating off the calcium chloride thus formed.

C.—Sand having a particle size of 0.2 to 1 mm.

A joint adhesive for concrete blocks is obtained by mixing the following parts (parts by weight):

|   | Parts |
|---|---|
| A | 1000 |
| B | 100 |
| C | 1000 |

For the preparation of a moulding resembling artificial stone, the following are mixed together:

|   | Parts |
|---|---|
| A | 100 |
| B | 50 |
| C | 2000 |

The following is the usual procedure:

Components B and C are mixed dry. Liquid component A is sprayed onto the resultant mixture. If desired a certain amount of water (for example 10% by weight of $H_2O$) may be added to the solution A prior to spraying. The water may however be sprayed into the mixture last of all or it may be omitted if it is desired that the mixture should set slowly, the moulding or coating then being moistened subsequently.

Another application of the process according to this invention, for example for the production of mouldings resembling artificial stone, consists in mixing B and C together, adding A, shaping the mixture and treating the moulding with steam. Steam treatment achieves high strengths in a short time. Mixtures having a higher proportion of filler still give good mechanical properties when cured with steam.

The binders may be used for making artifical stone, for bonding stone to stone, for making plasticised and elasticised mixtures of lime, mortar or cement-mortar, for coating artificial and natural stone with plastics, such as polyolefins, polystyrene, polybutadiene and rubber, for making shaped articles of wood, peat, straw, reeds, cellulose and other cellulosic materials, if desired with sand and cement. They may be used as joint adhesives.

They may also be used for: bonding artificial stone to wood, bonding wood to wood, bonding wood to plastics, bonding metal to plastics, bonding metal to stone, bonding metal to wood, bonding leather and bonding ceramics.

The following list gives examples of binders according to this invention:

Example 1

I

|   | Parts |
|---|---|
| Ethylsiloxane (formula given above) (A) | 1000 |
| Ethylcalcium siloxanate (formula given above) (B) | 500 |
| Quartz sand C(a) | 7500 |
| Portland cement 275. C(b) | 2500 |

II

| | |
|---|---|
| Ethylisiloxane | 1000 |
| Ethylcalcium siloxanate | 200 |
| Quartz sand | 9700 |
| Portland cement 275 | 100 |

Example 2

I

| | |
|---|---|
| Ethylphenylsiloxane | 1000 |

$$HO-\left[\begin{array}{c}C_2H_5\\|\\Si-O\\|\\OH\end{array}\right]_n\left[\begin{array}{c}C_6H_5\\|\\Si-O\\|\\OH\end{array}\right]_m H \quad (A)$$

($n=90$ mole%; $m=10$ mole%)

| | |
|---|---|
| Ethylcalcium siloxanate (B) | 500 |
| Quartz sand (0.2 to 0.5 mm particle size) (Ca) | 7500 |
| Portland cement 275. (Cb) | 2500 |

II

| | |
|---|---|
| Ethylphenylsiloxane (A) | 1000 |
| Ethylcalciumsiloxanate (B) | 200 |
| Quartz sand (0.2 to 0.5 mm. particle size) (Ca) | 9700 |
| Portland cement 275. (Cb) | 100 |

Example 3

I

| | |
|---|---|
| Vinylsiloxane | 1000 |

$$HO-\left[\begin{array}{c}CH=CH_2\\|\\Si-O\\|\\OH\end{array}\right]_n H \;(n\leq 20) \quad (A)$$

| | |
|---|---|
| Ethylcalcium siloxanate (B) | 150 |
| Quartz sand (0.2 to 1 mm. particle size) (C) | 1500 |

II

| | |
|---|---|
| Vinylsiloxane | 1000 |
| Ethylcalcium siloxanate | 500 |
| Quartz sand (0.2 to 1 mm.) | 10,000 |

III

| | |
|---|---|
| Vinylsiloxane | 1000 |
| Ethylcalcium siloxanate | 200 |
| Quartz sand (0.2 to 1 mm.) | 9800 |

Example 4

I

| | |
|---|---|
| Propylsiloxane | 100 |

$$HO-\left[\begin{array}{c}C_3H_7\\|\\Si-O\\|\\OH\end{array}\right]_n H \;(n\leq 20) \quad (A)$$

| | |
|---|---|
| Propylcalcium siloxanate (B) | 20 |
| Wood chips. (C) | 1500 |

II

| | Parts |
|---|---|
| Propylsiloxane (A) | 1000 |
| Propylcalcium siloxanate (B) | 500 |
| Wood chips. (C) | 10,000 |

III

| | |
|---|---|
| Propylsiloxane | 1000 |
| Propylcalcium siloxanate | 200 |
| Wood chips | 9800 |

Example 5

I

| | |
|---|---|
| Propylsiloxane (A) | 150 |
| Propylcalcium siloxanate (B) | 20 |
| Polystyrene foam flakes. (C) | 1200 |

II

| | |
|---|---|
| Propylsiloxane | 1000 |
| Propylcalcium siloxanate | 500 |
| Polystyrene foam flakes | 10,000 |

III

| | |
|---|---|
| Propylsiloxane | 1000 |
| Propylcalcium siloxanate | 200 |

| | Parts |
|---|---|
| Polystyrene foam flakes | 9800 |

Example 6

I

| | |
|---|---|
| Polycondensate of diphenylsilanediol and methyl silicate (A) | 150 |
| Methylcalcium siloxanate (B) | 20 |
| Polypropylene flakes (C) | 2000 |

II

| | |
|---|---|
| A | 1000 |
| B | 500 |
| C | 10,000 |

III

| | |
|---|---|
| A | 1000 |
| B | 200 |
| C | 9800 |

Example 7

I

| | |
|---|---|
| Polycondensate of diethylsilanediol and ethyl silicate (A) | 500 |
| Ethylcalcium siloxanate (B) | 100 |
| Asbestos fibres (Ca) | 4000 |
| Portland cement 375 (Cb) | 500 |

II

| | |
|---|---|
| A | 1000 |
| B | 200 |
| Ca | 9700 |
| Cb | 100 |

Example 8

I

| | |
|---|---|
| Ethylsiloxane dissolved in ethyltriethoxysilane (A) | 100 |
| Methylcalcium siloxanate (B) | 20 |
| Cork granulate (C) | 1500 |

II

| | Parts |
|---|---|
| A | 1000 |
| B | 200 |
| C | 9800 |

Example 9

I

| | |
|---|---|
| Methylsiloxane (A) | 1000 |

$$HO-\left[\begin{array}{c}CH_3\\|\\Si-O\\|\\OH\end{array}\right]_n H \;(n\leq 50)$$

| | |
|---|---|
| Ethylcalcium siloxanate (B) | 150 |
| Calcium metasilicate (Ca) | 100 |
| Pumice granulate (Cb) | 7500 |

II

| | |
|---|---|
| A | 100 |
| B | 100 |
| Ca | 100 |
| Cb | 10,000 |

Example 10

I

| | Parts |
|---|---|
| Ethylsiloxane (A) | 1000 |
| Ethylcalcium siloxanate | 1000 |

Referring to the examples:

Mixtures set out under I are suitable for use for example as joint adhesives or coating agents.

Mixtures set out under II and III may serve for the production of mouldings.

For stirring mixtures I, about 600 parts of alcohol (mixture of equal parts of $C_1$ to $C_3$) and about 200 parts of water are added to each 1000 parts of A.

The liquid requirement for mixtures II is about 500 parts of the mixture of water and alcohol for each 1000 parts of A. In this way a cure time is achieved which allows about twenty hours before mouldings are strong enough to be transported.

The vinylsiloxane binder in Example 3 is an exception, for it sets in about forty minutes, and the methylsiloxane binder in Example 9, which sets in about fifteen minutes, is another exception.

Alcohol and water are interchangeable. An excess of alcohol causes slower setting, while an excess of water causes more rapid setting.

Mixture I in Example 3 may be used as a primer for concrete surfaces, for example to render layers of unsaturated polyester resin adherent thereto.

The same mixture gives coatings resembling enamel on metal surfaces, such as iron or stainless steel.

MixtureI in Example 4 gives chipboard having great resistance to water when press molded in a press at 100° C. at a pressure of about 50 atmospheres gauge.

Mixtupre I in Example 5 may be used for filling cavities, for example for thermal insulation.

Mixture I in Example 6 may be used for making floor-coverings.

The mixtures in Example 7 are binders or molding materials reinforced by asbestos fibres.

The mixtures in Example 8 are binders containing cork, and in Example 9 binders containing pumice. Both are distinguished by very low water adsorption.

We claim:
1. An organosilicon binder comprising: (a) a member selected from the group consisting of lower alkyl silanols, lower alkenyl silanols, alkylene disilanols, phenyl silanols and siloxanes thereof and (b) a member selected from the group consisting of solid or semi-sold calcium silanolate and solid or semi-sold calcium siloxanate.
2. A binder as claimed in claim 1 in which component (b) is calcium siloxanate.
3. A binder as claimed in claim 1 which also contains a filler.
4. A binder as claimed in claim 3 in which the filler is cement.

References Cited

UNITED STATES PATENTS

| | | |
|---|---|---|
| 3,061,587 | 10/1962 | Rust. |
| 3,098,050 | 7/1963 | Noll. |
| 3,153,000 | 10/1964 | Takimoto. |
| 3,152,999 | 10/1964 | Rust. |
| 3,190,762 | 6/1965 | Carlson. |
| 2,813,085 | 11/1957 | MacMullen. |

FOREIGN PATENTS 746,038   3/1956   Great Britain.

MORRIS LIEBMAN, *Primary Examiner.*

L. T. JACOBS, *Assistant Examiner.*

U.S. Cl. X.R.

260—37, 825